United States Patent [19]
Rauchwerger

[11] 3,864,974
[45] Feb. 11, 1975

[54] CAPACITANCE PROBE AND SYSTEM FOR PRECISION MEASUREMENT OF LIQUID LEVEL

[76] Inventor: George P. Rauchwerger, 147 Cromart Ct., Sunnyvale, Calif. 94087

[22] Filed: Nov. 27, 1972

[21] Appl. No.: 309,735

Related U.S. Application Data

[63] Continuation-in-part of Ser. No. 105,254, Jan. 11, 1971, Pat. No. 3,710,244.

[52] U.S. Cl............................................. 73/304 C
[51] Int. Cl. ........................................... G01f 23/26
[58] Field of Search....... 73/304 C; 324/60 R, 60 C, 324/61 R

[56] References Cited
UNITED STATES PATENTS

| | | | |
|---|---|---|---|
| 2,375,084 | 5/1945 | Coroniti | 73/304 C |
| 3,494,193 | 2/1970 | Fannz | 73/304 C |
| 3,746,975 | 7/1973 | Maltby | 73/304 C |

Primary Examiner—S. Clement Swisher
Attorney, Agent, or Firm—Julian Caplan

[57] ABSTRACT

The capacitance probe consists of a vertical insulated wire stretched taut in the tank, or other container, where liquid level is to be measured. Fittings at the top and bottom conveniently and efficiently support and tighten the wire. The system comprises an oscillator which impresses a sinusoidal voltage in series with the probe, preferably through a transformer so that there are no active electronics at the probe. One end of the probe is at ground potential. A long transmission line may connect the probe to the measuring electronics. Zero and maximum references are individually calibrated by means of potentiometers. The zero signal is rectified by a precision detector, so that the zero signal follows or tracks the maximum signal automatically. The probe signal, properly amplified, also passes through a detector, and this signal and the automatic zero signal are fed to a differential amplifier and thence to a meter or control device.

5 Claims, 8 Drawing Figures

CAPACITANCE PROBE AND SYSTEM FOR PRECISION MEASUREMENT OF LIQUID LEVEL

This application is a continuatin-in-part of Serial No. 105,254, filed Jan. 11, 1971, now U.S. Pat. No. 3,710,244.

A principal object of the present invention is to provide a simple, reliable and accurate means to measure the level of liquids in a tank reservoir, etc., and to display the mesurement directly in engineering units such as feet, meters, etc. The system employs no moving mechanical parts.

One of the features of the invention is the provision of a probe which is simple to install, is chemically inert, has no moving parts and is in trinsically safe so that it will not cause explosions or fire. A feature of the invention is the fact that there are no active electronic components at the probe head and there is no power at the probe head so that the danger of explosions and fire is minimized.

Another feature of the invention is the provision of a centralized location for the measurement of a plurality of containers with simple switching means to switch from one container to the next. The container may be located as far as 1,000 feet from the measurement unit without deterioration of accuracy of the measurement. Further, there is provided individual calibration for each container for zero and maximum heights located at the central monitor.

Another feature of the invention is the provision of individual probe calibration at the measuring unit rather than at the probe end of the system.

Another feature of the invention is the fact that it provides simple interfacing to analog controls for automatic pump or other device operations. In addition, the system provides simple interfacing for computer operation.

Another feature of the invention is the fact that the circuitry is solid state and employs standard integrated circuits.

In one form of the invention there are no weights, and in the invention there are no floats, all of which are undesirable features of prior liquid measuring systems.

Other objects of the present invention will become apparent upon reading the following specification and referring to the accompanying drawings in which similar characters of reference represent corresponding parts in each of the several views.

Essentially the system of the present invention comprises a capacitance probe 11, a measuring circuit indicated generally at 12, an oscillator 13 and a display, or control, device 14.

Oscillator 13 impresses a sinusoidal voltage in the range of 10 to 30 Khz in series with the capacitance probe 11. The probe 11 is located vertically in a container such as the tank 31 of FIG. 3, a reservoir or other location having a fluctuating liquid level. As liquid moves up or down the probe, the probe capacitance varies in direct proportion to the liquid covering the probe. Since the probe capacitance ($Cx$) is effectively in series with the oscillator 13 and a charge amplifier Al, the energy transferred from the oscillator 13 to amplifier Al is directly proportional to the variation of $Cx$. The output of the amplifier Al is then equal to the inverse ratio of the feedback capacitor ($Cf$) and the probe capacitor ($Cx$). Therefore, $Vo = Cx$ divided by $Cf$.

Theoretically, the output of amplifier Al is then connected to a precision peak detector A A2 and then to a display, or control, device 14, which can be calibrated to read any desired units such as feet or meters or to control any desired function as by means of a solenoid valve control (not shown) or the like. It has been found as a matter of practice, however, that the foregoing simplified circuit does not yield precise results. The present invention provides a practical, yet precise, instrument for such purpose.

Figure 2B:
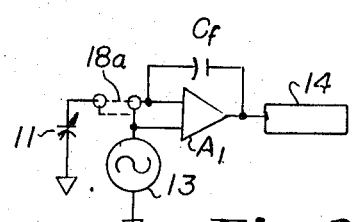
FIGS. 2A and 2B are more elementary schematics.
Figure 2A:
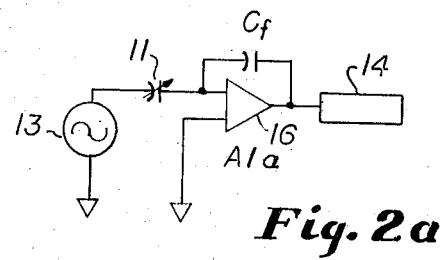
Figure 2:
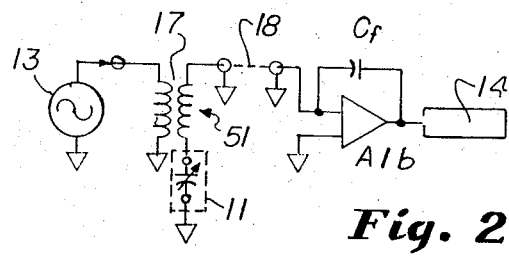
FIG. 2 is a simplified schematic of a preferred form of the invention.

Referring to FIG. 2A, this figure represents an equivalent circuit for ideal situations, such as where there are very short leads between the probe and the display. However, the system is not suitable where the probe capacitor must be at ground potential, such as in the present invention. Furthermore, a long wire must be connected from the probe capacitor to the measuring circuit without affecting the capacitance to be measured, and at the same time, to make the stray capacitances as low as possible. Referring to FIG. 2, an equivalent circuit is shown which is more in keeping with the requirements of the present invention. A ferrite pot-core transformer 17 is placed in the probe head 51 which is mounted at one end of the probe 11. Transformer 17 provides the desired results without resorting to placing active electronics at the probe. Transformer 17 effectively places the oscillator 13 in series with the probe 11. It allows the end of the probe to be at ground potential. It allows long transmission lines 18 (1,000 feet or more to be connected between the probe head 51 and the measuring electronics, all without deterioration in accuracy.

FIGS. 2B is another way of accomplishing results similar to that of FIG. 2 but the accuracy is not as good for large values of probe to liquid capacitance.

Figure 1:
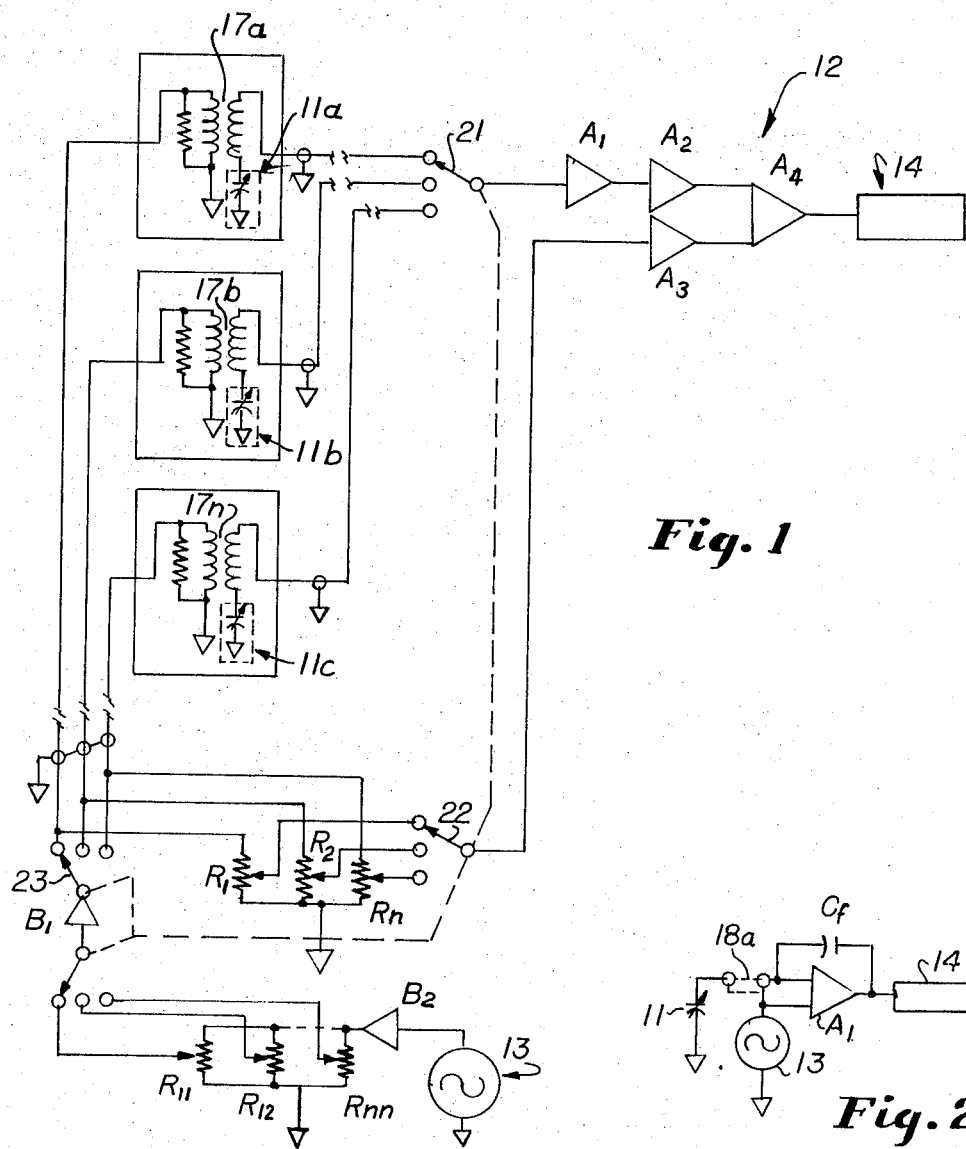
FIG. 1 is a schematic circuit diagram of one form of the invention showing a plurality of probes located at a distance with a centralized measuring and display or control.

Directing attention now to the preferred embodiment of FIG. 1, the signal passing through the charge amplifier Al is detected by detector A2 and amplified by amplifier A4. It is then read on a meter 14 or used to control some function such as a valve. However, this simplified version does not yield a precise measurement, since it does not take into account stray capacitances of the probe, there is no zero reference, and calibration is most difficult.

To provide a zero reference, proper calibration, and nulling of stray capacitances when the tank is empty, a second detector A3, a differential amplifier A4 and proper buffer amplifiers B1 and B2 are added. Detector A3 rectifies a portion of the outgoing oscillator signal. It tracks this signal whenever its amplitude is changed.

This is necessary to calibrate the system. When the tank is emptied, the desired output at display 14 is zero. Setting at zero is accomplished by adjusting the zero calibration controls R1, R2, RN depending upon the number of probes being used. When the tank is full, the maximum reading is then calibrated by varying the oscillator amplitude controls R11, R12, RNN. This adjustment must be independent of the zero adjustments; and, therefore, it is necessary to track the oscillator. In effect by doing so, the difference between the outputs of the two detectors is always zero when the tank is empty or at the zero level condition. With this in mind, a differential amplifier A4 is used to measure the true value of the probe capacitance; and in turn, the actual liquid level.

Once the system has been calibrated for zero and maximum, to the desired reading in feet, centimeters, etc., it will measure the exact liquid level, since the difference between zero and maximum is a perfectly linear function. Because of the above features, the system lends itself well to a centralized, multiple tank liquid level measuring instrument. The switching from station to station is accomplished as shown in FIG. 1, it being understood that the four switches 21-24 are mechanically or electrically interconnected for turning together.

Display device 14 may be an analog or digital volt meter in the range of 1-10 volts dc. Instead of, or as a supplement to the display device 14, a control device may be any solid state or electro-mechanical device with a compatible input voltage to operate pumps, gates, or any function desired.

By using a digital voltmeter as a display, it can also serve as an interface to a computer, since most such digital voltmeters have bianary coded decimal outputs.

PROBES

Figure 5:
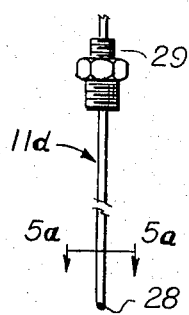
FIG. 5 is a schematic view showing a more elementary probe than is shown in FIG. 4.
Figure 5A:
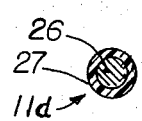
FIG. 5A is an enlarged cross-sectional view taken substantially along the line 5A—5A of FIG. 5.

Preferred probes for the foregoing described system are other features of this invention. For small tanks, as shown in FIGS. 5, 5A, in range of up to ten feet in height, a semi-rigid probe made of 3/16 inch to ¼ inch brass, or stainless steel, rod 26 is insertted into a tight-fitting, thin-walled Teflon tube 27 to act as an insulator and to provide corrosion resistance. The bottom end of probe 11d is hermetically sealed with epoxy 28 after the teflon is properly etched. The top of the probe is received in a suitable fitting 29 for mounting in the top of a tank and for electrical connection.

Figure 3:
FIG. 3 illustrates in perspective a typical container in which one form of the invention may be installed, partly broken away to reveal interior construction.
Figure 4:
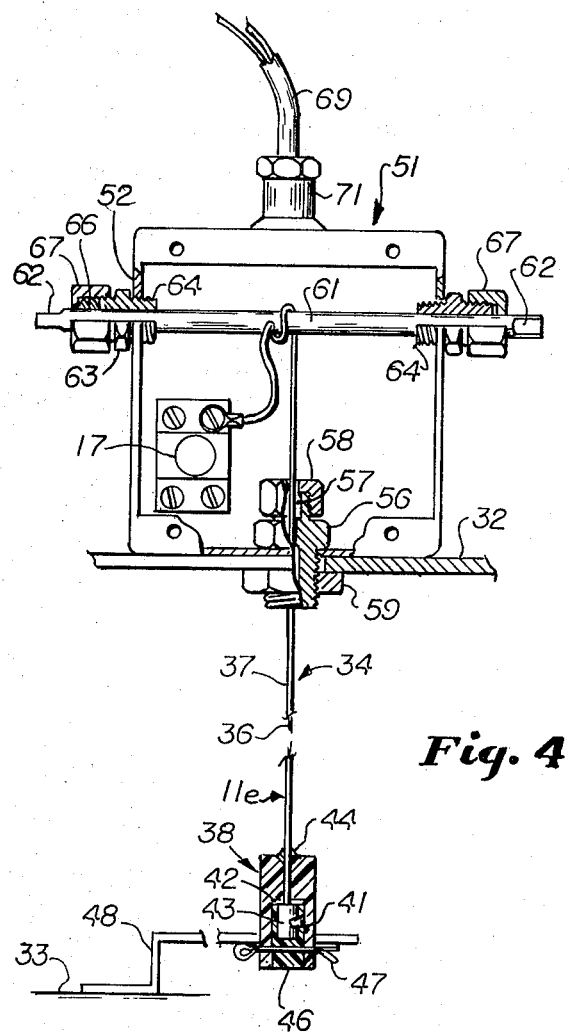
FIG. 4 is an enlarged sectional view showing a probe lower end and head in accordance with the present invention.

For large tanks (in excess of 10 feet), as shown in FIGS. 3 and 4, a flexible probe 11e is employed. Probe 11e consists of the probe proper which may be wire 34, a probe seal or plug 38, and a probe head 51.

Wire 34 has copper strands, or stainless steel, core 36 insulated with teflon 37, the insulation being between 10 and 15 mils thick. The bottom of wire 34 is sealed by seal 38 hereinafter explained.

The plug 38 is machined from a piece of teflon rod approximately ½ inch in diameter and 1¼ inch long. A counterbored hole 41 is formed in the bottom and a countersink at the top. The end of wire 34 is stripped about ¼ inch and is inserted through the small hole in plug 38 and thence through a stainless steel washer 42 and a crimp ferrule 43 which is crimped about the end of the wire and holds it securely. This structure relieves strain and holds the wire inside the plug when it is under tension. Before the teflon surfaces are sealed, they are etched with a commercially available chemical to provide proper bonding. The wire 34 is pulled tight so that washer 42 is in close contact with the shoulder in the bore 41. The inside of the bore 41 is completely filled with a high strength semi-flexible epoxy filler 46. The countersunk portion at the top of the plug is filled with epoxy 44 forming a seal around the wire protruding from the plug. After the epoxy 46 has hardened, a transverse hole is drilled to accept cotter pin 47 to secure the probe to its anchor 48. The anchor 48 may be a flat leaf spring bent in Z shape as shown in FIGS. 3 and 4, one end of the spring being welded to the bottom 33 of tank 31. The plug 38 is passed through a hole in the free end of spring 48 and the cotter pin 47 used to secure the plug 38 in place. The spring 48 (which is preferably corrosion resistant) provides strain relief for the probe to protect from varying conditions in the tank and also to provide constant tension on the probe. Where it is not possible to anchor the probe on the bottom, weight is placed on plug 38 to maintain proper tension on the probe.

Probe head 51 is secured to the top 32 of tank 31. It functions to support the probe and to apply tension to the probe as well as to provide a pressure seal at the top of the tank. It provides a terminal for the transmission lines in a weather-proof housing and the line transformer may be installed therein if desired. A preferred form of probe head 51 consists of a casing 52 which is closed by a cover 53 with a hermetic seal. The probe wire 34 is brought up into the casing 52 through a fitting 56 which is threaded into the top 32 and held in place by nut 59 or other means whereby a tight seal is effected between the fitting 56 and the top 32. A teflon ferrule 57 is slipped over the outside of the wire 34 interiorly of housing 52. Hollow nut 58 is threaded on to the upper end of fitting 56; and as it is tightened, the ferrule 57 is squeezed so that a throughly tight seal is accomplished. This seal is effective against pressure, liquid and gas. At the time the ferrule 57 is squeezed, the wire 34 has been drawn taut as hereinafter explained.

A transverse shaft 61 is mounted in casing 52 and a hole is drilled therein through which the wire 34 fits. By turning shaft 61, wire 34 is drawn taut until proper tension is reached. Hollow nut 58 is then tightened to squeeze pressure seal 57, as heretofore explained. The flattened end 62 of rod 61 extends exteriorly of casing 52. A double-end threaded fitting 63 is provided, the threads 64 engaging threaded holes in casing 52. Externally of casing 52 a compressible brass ferrule 66 is slipped over the shaft 61, and on the outside of ferrule 66 is a hollow nut 67. When nut 67 is tightened, the ferrule 66 is distorted, causing it to thereafter permanently turn with shaft 61. By tightening nut 67, the shaft 61 may be secured in place. When the nut 67 is loosened, the shaft 61 may be tightened or loosened. A duplicate of the construction on the left-hand end of the head 51 may be provided or the ferrule 66 may be omitted. Alternatively, the opposite fitting may have an O-ring which acts as a friction clutch and water seal. The probe wire 36 is connected to transformer 17 and thence connected to lead wire 69 through standard fitting 71.

Applications of the system are numerous. A principal application is measuring the height of liquid in wine and champagne tanks where it is difficult to measure the quantity of wine in a very large steel pressurized tank. Accurate inventory is essential in this and similar industries. Other applications include measurement and control of liquid levels in water pollution control, dairies, breweries, distilleries, chemical processing plants, etc.

What is claimed is:

1. A liquid level measuring system for use in a container comprising an oscillator having one terminal at ground potential, a capacitance probe to be immersed in the liquid to be measured, said probe having a conductor, the lower end of said conductor being adjacent the bottom of said container, said conductor sheathed by an insulator, the other conductor of said probe comprising the liquid in said container, a transformer having one coil in series with said oscillator and being at ground potential at the opposite end and a second coil in series with said probe at one end and with a measuring circuit at the other end, said measuring circuit being remote from said probe, said transformer and said probe being located in close proximity to each other and separated from sid measuring circuit by long wires, said measuring circuit comprising a charge amplifier having its input connected at one end to said second coil.

2. A system according to claim 1 in which said measuring circuit further comprises a first detector having its input connected to the output of said charge amplifier, a second detector having its input connected to said oscillator, a differential amplifier having its inputs connected to the outputs of both said detectors and a display or control connected to the output of said differential amplifier.

3. A system according to claim 2 which further comprises zero adjusting means comprising a voltage divider having one end connected through a buffer amplifier to said oscillator and its opposite end connected to said first coil of said transformer and having its adjustable tap connected to said second detector, said voltage divider being adjustable so that when said liquid level in said container is zero the output for said display or control corresponds to a zero reading.

4. A system according to claim 2 which further comprises a maximum adjusting means comprising a voltage divider having one end terminal connected through a buffer amplifier to said oscillator and its opposite end terminal to ground and its center tap connected to the first coil of said transformer, said voltage divider being adjustable so that when said liquid level in said container is full, the output for said display or control corresponds to maximum reading.

5. A system according to claim 2 which comprises a pair of long coaxial cable leads, both having their shields at ground potential, one said lead connecting said oscillator and said first coil of said transformer, the other said lead connecting the input of said charge amplifier and said second coil of said transformer.

* * * * *